(12) United States Patent
Schramm et al.

(10) Patent No.: US 8,590,109 B2
(45) Date of Patent: Nov. 26, 2013

(54) APPARATUS AND METHODS FOR AUTOMATICALLY TRAINING SAW BLADES ON A SAW MANDREL

(76) Inventors: Timothy Walter Schramm, Bronwood, GA (US); Kendall Keith Gill, Leesburg, GA (US)

( * ) Notice: Subject to any disclaimer, the term of this patent is extended or adjusted under 35 U.S.C. 154(b) by 159 days.

(21) Appl. No.: 13/332,854

(22) Filed: Dec. 21, 2011

(65) Prior Publication Data

US 2013/0160610 A1  Jun. 27, 2013

(51) Int. Cl.
*D01B 1/08* (2006.01)
(52) U.S. Cl.
USPC .......................................... 19/5 R

(58) Field of Classification Search
USPC ............................... 19/55 R, 63, 64
See application file for complete search history.

(56) References Cited

U.S. PATENT DOCUMENTS

| 3,490,101 | A | * | 1/1970 | Fountain | 19/55 R |
| 3,795,248 | A | * | 3/1974 | Long | 460/135 |
| 4,085,630 | A | * | 4/1978 | Williams | 76/27 |
| 4,400,851 | A | * | 8/1983 | Hudson | 19/55 R |
| 4,457,049 | A | * | 7/1984 | Hudson et al. | 19/48 R |
| 4,875,393 | A | * | 10/1989 | Williams | 76/27 |

\* cited by examiner

*Primary Examiner* — Shaun R Hurley
(74) *Attorney, Agent, or Firm* — Withers & Keys LLC

(57) ABSTRACT

Apparatus and methods for automatically training (i.e., straightening) saw blades along a saw mandrel are disclosed.

20 Claims, 7 Drawing Sheets

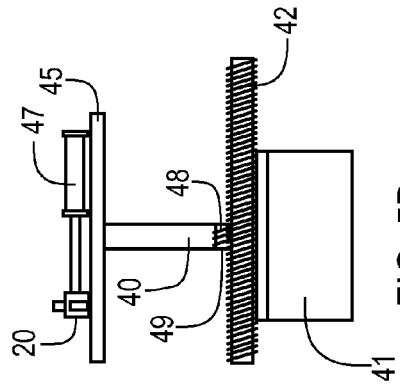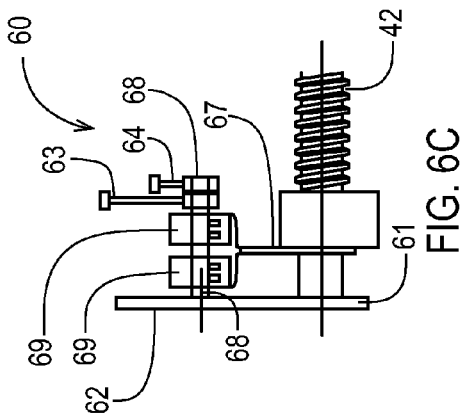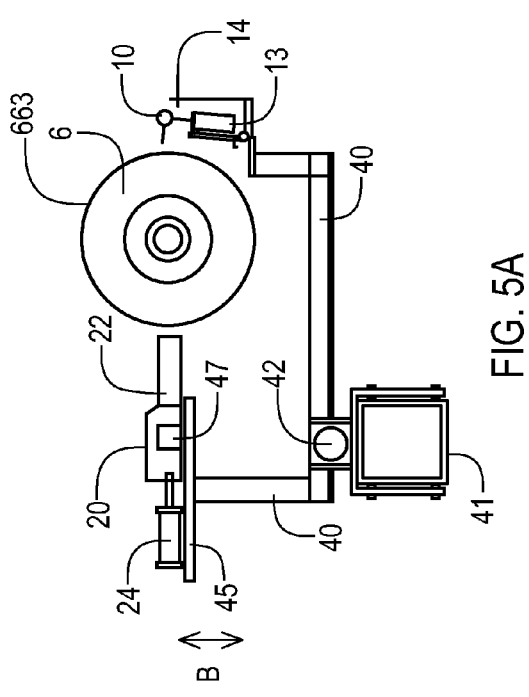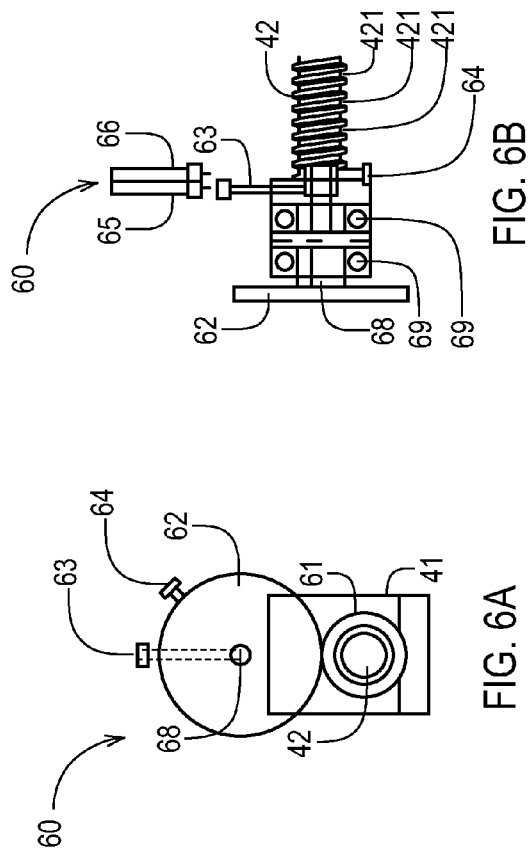

APPARATUS AND METHODS FOR AUTOMATICALLY TRAINING SAW BLADES ON A SAW MANDREL

TECHNICAL FIELD

The present invention relates to apparatus and methods for automatically training (i.e., straightening) saw blades along a saw mandrel.

BACKGROUND

Cotton is a plant grown in the warmer climates of the world. It is a fibrous material used to make many types of products including, but not limited to, clothing, towels, paper, etc. When cotton is harvested, it is composed of two parts, (i) the fibrous material called lint, and (ii) the seed. The seed is attached to the lint and must be removed for the lint to be used to make yarn or other products. The process of removing the seed is called ginning.

There are two types of ginning, namely, roller ginning and saw ginning Extra long staple or long fiber length cottons are roller ginned. This is a gentle way of removing the seed as the lint and seed separate easily. Upland cotton is saw ginned. Saw ginning is a more aggressive procedure, which is needed as the seed is attached firmly to the lint.

The machine that performs saw ginning is called a gin stand. The gin stand consists of a gin saw mandrel, a gin breast, a doffing brush, an application roller, and an agitator or seed tube. Different manufacturers have different names for some of the parts, but the components are all basically the same.

The saw mandrel consists of multiple saw blades on a shaft with each saw blade separated by a spacer positioned between adjacent saw blades. The saw mandrel is threaded on each end and a nut is tightened to push the saws and spacers together and to keep them from moving. Saw mandrels vary in length by model and manufacturer. Saw mandrels are typically from 72.0 inches (in.) to 100.0 in. in length. The saw blades and spacers also vary in diameter and thickness. The saw blades typically have (i) a thickness ranging from about 0.036 in. to about 0.045 in. and (ii) a diameter of from about 12.0 in. to about 18.0 in. The spacers also vary in diameter and thickness. The spacers on any given saw mandrel are smaller in diameter than the saw blades. For example, one manufacturer's mandrel uses twelve-inch diameter saw blades with six-inch diameter spacers.

The gin breast consists of individual vertical members called ribs. The center to center measurement between the gaps in the ribs matches the center to center measurement between the saw blades on the saw mandrel for a particular gin stand. The gap between ribs may vary, but is typically from about 0.090 in. to about 0.125 in.

In the saw ginning process, cotton is grabbed by the teeth on the saw blades and pulled between the ribs. The gap between the ribs is smaller than the seed. Thus, the gin stand separates the cotton fiber from the cotton seed.

As ginning capacity has increased and seed size has been reduced due to new varieties of cotton, the gap between ribs has been getting smaller over the years. Although the center measurements vary with model and manufacturer, manufacturers have been required to reduce the center measurement in response to a smaller seed size. For example, one manufacturer uses a spacing of 0.5741 in. between centers (i.e., between centers of saw blades).

A saw mandrel is assembled by sliding a saw blade and a spacer onto a shaft, and repeating, until all of the saw blades and spacers are on the shaft. A nut is then placed on each threaded end of the shaft and tightened to push the saws and spacers together to keep them tight and to keep them from moving. A template the length of the mandrel with marks for correct spacing is placed on the saw cylinder to check spacing. If needed, the nuts are loosened and shims are intermittently added to match the template as closely as possible. Each saw blade is then individually bent (manually) with a fork bending tool to match each mark on the template. A mark is then drawn along the length of the cylinder at the position of the template. At this one point, the spacing should be correct on the saw mandrel. Although the cylinder (and saw blades positioned thereon) should be correct in this one point, each saw blade must be checked along the 360 degrees of each saw blade. This is needed as the saw blades may have a slight kink in them or an imperfection in one or more space blocks may cause the saw blades to wobble as it rotates in the gin stand. "Training" the saw blades is the process for straightening the blades.

Up until now, training of saw blades has been done with a manual and archaic procedure. Starting at the first blade, a dial indicator is put on the mark that was made with the template. The saw blade is then rotated and as the dial indicator moves to an unacceptable level the saw blade is manually bent with the fork saw training tool until the saw blade is in an acceptable range. This is repeated the entire 360 degrees of the saw blade. This procedure is repeated for each blade on the saw mandrel.

A slight variation of this manual procedure is using a pointer on the alignment mark and slightly off the blade. The saw blade is turned and trained by visual reference of the pointer to the wobble of the blade. Using the dial indicator is a much more accurate method of these two procedures. However, the problem even with the dial indicator method is the accuracy depends on the initial setup using the template. It is using a visual reference for each blade that must be very accurate for the dial indicator to give a true reading. This can be done, but is extremely time-consuming to complete one saw mandrel. Further, due to the time factor, the precise initially accuracy is often overlooked.

The gin operator or gin owner will not know the quality of the "training job" until the saw mandrel is installed in the gin stand. If the saw blades are rubbing the ribs, the saw blades rubbing will have to be manually trained in the gin stand to be clear of the ribs. Rubbing saw blades shorten the life of the saw blades and ribs, and if the rubbing is severe enough, the rubbing can be a fire hazard as cotton is extremely flammable. Further, the horsepower required to turn the mandrel is increased due to friction, and the capacity of the gin stand is decrease.

What is needed in the art is an apparatus and method for automatically training saw blades along a saw mandrel so as to eliminate the inefficient, time-consuming process of manually training saw blades along a saw mandrel.

SUMMARY

The present invention addresses the need for an apparatus and method for automatically training saw blades. The apparatus and methods of the present invention enable efficient, cost-effective and accurate training of saw blades, which ultimately results in more efficient and cost-effective separation of cotton fiber from cotton seed.

Accordingly, the present invention is directed to methods of automatically training saw blades along a saw mandrel. In one exemplary embodiment, the method of the present invention comprises a method of automatically training saw blades along a saw mandrel, wherein the method comprises positioning a gauge relative to a first saw blade along a saw mandrel such that left and right gauge contact members of the gauge extend along opposite left and right major surfaces of the first saw blade, respectively, and the first saw blade is between the left and right gauge contact members; and in response to the first saw blade touching at least one of the left and right gauge contact members during rotation of the saw mandrel, bending the first saw blade in a right direction if the first saw blade touches the left gauge contact member, and bending the first saw blade in a left direction if the first saw blade touches the right gauge contact member.

In another exemplary embodiment, the method of the present invention comprises a method of automatically training saw blades along a saw mandrel, wherein the method comprises rotating a saw mandrel comprising multiple saw blades spaced from one another along the saw mandrel; and in response to a first saw blade not touching left or right gauge contact members of a gauge during at least one complete rotation of the saw mandrel and while the gauge is in an activated position, moving the gauge into a deactivated position via a programmable logic controller; and simultaneously moving the gauge and a bender along the saw mandrel a distance equal to a spacing between adjacent saw blades via the programmable logic controller.

The disclosed methods of automatically training saw blades along a saw mandrel may comprise one or more additional method steps. Suitable additional method steps may include, but are not limited, positioning a bender relative to the first saw blade such that left and right bender contact members of the bender extend along the opposite left and right major surfaces of the first saw blade, respectively, and the first saw blade is between the left and right bender contact members; rotating the saw mandrel; in response to the first saw blade not touching the left or right gauge contact members during at least one complete rotation of the saw mandrel, moving the gauge and the bender away from the first saw blade such that the left and right gauge contact members of the gauge and the left and right bender contact members of the bender do not extend along the opposite left and right major surfaces of the first saw blade, simultaneously moving the gauge and the bender along the saw mandrel a distance equal to a spacing between adjacent saw blades, and moving the gauge and the bender toward a second saw blade of the saw mandrel such that the left and right gauge contact members of the gauge and the left and right bender contact members of the bender extend along opposite left and right major surfaces of the second saw blade; in response to the second saw blade touching at least one of the left and right gauge contact members during rotation of the saw mandrel, bending the second saw blade in a right direction if the second saw blade touches the left gauge contact member, and bending the second saw blade in a left direction if the second saw blade touches the right gauge contact member; and any combination of the disclosed method steps.

The present invention is further directed to apparatus for automatically training saw blades along a saw mandrel. In one exemplary embodiment, the apparatus of the present invention comprises an apparatus for automatically training saw blades along a saw mandrel, wherein the apparatus comprises a gauge comprising left and right gauge contact members, the left and right gauge contact members being spaced from one another so as to be positionable along opposite left and right major surfaces of a first saw blade positioned along a saw mandrel such that the first saw blade is between the left and right gauge contact members; and a bender comprising left and right bender contact members, the left and right bender contact members being spaced from one another so as to be positionable along the opposite left and right major surfaces of the first saw blade such that the first saw blade is between the left and right bender contact members, wherein in response to the first saw blade touching at least one of the left and right gauge contact members during rotation of the saw mandrel, the bender is operatively adapted to (i) bend the first saw blade in a right direction if the first saw blade touches the left gauge contact member, and (ii) bend the first saw blade in a left direction if the first saw blade touches the right gauge contact member.

The apparatus of the present invention may further comprise a number of additional components. Suitable additional apparatus components include, but are not limited to, one or more apparatus components operatively adapted to move the gauge and the bender toward or away from the first saw blade; a support structure operatively adapted to support and allow rotation of a saw mandrel; a first motor and associated connecting components operatively adapted to rotate the saw mandrel when positioned within the support structure; a ball screw extending parallel to the saw mandrel when positioned within the support structure; a second motor and associated connecting components operatively adapted to rotate the ball screw; a movable support structure operatively adapted to (i) support the gauge and the bender, and (ii) move along the ball screw; a first gear coaxially positioned along the ball screw; a second gear in rotationable contact with the first gear; a gear sensor operatively adapted to detect a position of the second gear, wherein one complete rotation of the second gear moves the movable support structure a distance along the ball screw equal to a spacing between adjacent saw blades; a sprocket coaxially positioned along the saw mandrel; a sprocket sensor operatively adapted to detect a rotating position along the sprocket relative to the sprocket sensor; an electrical current through the saw mandrel such that (i) contact of the first saw blade with the left gauge contact member of the gauge completes a first circuit and generates a first signal, and (ii) contact of the first saw blade with the right gauge contact member of the gauge completes a second circuit and generates a second signal; and a programmable logic controller (PLC) operatively adapted to receive the first and second signals, and in response to receiving the first signal, sending a first command to the bender so as to cause the bender to bend the first saw blade in the right direction, and in response to receiving the second signal, sending a second command to the bender so as to cause the bender to bend the first saw blade in the left direction.

These and other features and advantages of the present invention will become apparent after a review of the following detailed description of the disclosed embodiments and the appended claims.

BRIEF DESCRIPTION OF THE FIGURES

The present invention is further described with reference to the appended figures, wherein:

FIG. 5A depicts a side view of the exemplary gauge shown in FIG. 3A and the exemplary bender shown in FIG. 4, both of which are supported by an exemplary movable support member that is movable along a ball screw;

FIG. 5B depicts a rear view of the exemplary movable support member and ball screw shown in FIG. 5A;

FIG. 6A depicts a side view of exemplary timing assembly components suitable for use in the exemplary apparatus shown in FIG. 1;

FIG. 6B depicts a top view of the exemplary timing assembly components shown in FIG. 6A;

FIG. 6C depicts a frontal view of the exemplary timing assembly components shown in FIG. 6A as viewed from a right-hand side of the exemplary timing assembly components.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to methods of automatically training saw blades along a saw mandrel so as to eliminate the inefficient, time-consuming process of manually training saw blades along a saw mandrel. The present invention is further directed to apparatus for automatically training saw blades along a saw mandrel. An exemplary apparatus of the present invention is depicted in FIG. 1.

Figure 1:
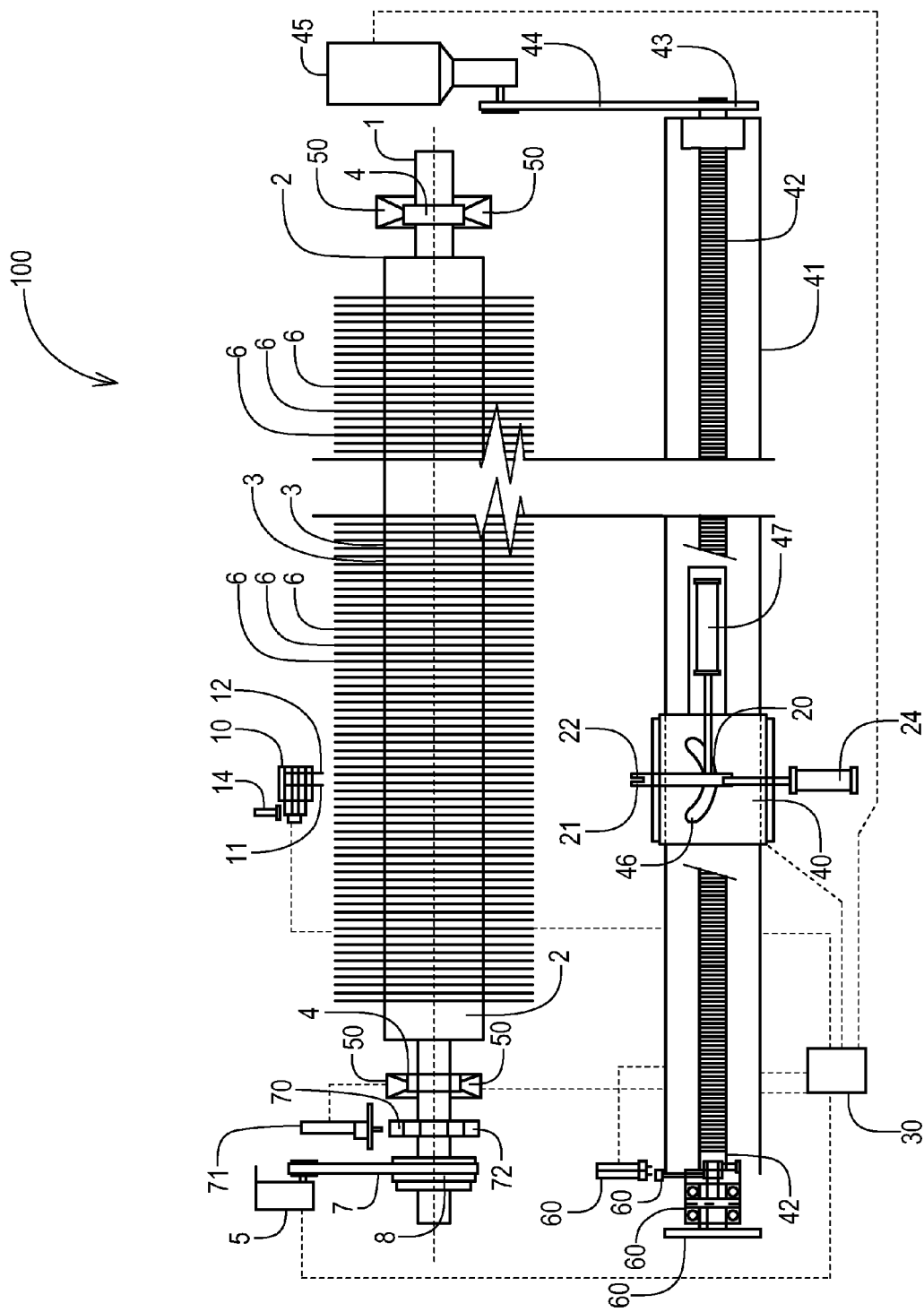
FIG. 1 depicts a top view of an exemplary apparatus of the present invention.

As shown in FIG. 1, exemplary apparatus 100 comprises a number of components including, but not limited to, a gauge 10 operatively adapted to detect a point out of tolerance on a given saw blade 6; a bender 20 operatively adapted to bend a given saw blade 6 depending on the rotational position of the given saw blade 6 as detected by gauge 10; and a programmable logic controller (PLC) 30 operatively adapted to (i) receive one or more signals from various apparatus components (e.g., gauge 10), and (ii) in response to receiving the one or more signals, providing one or more commands to one or more apparatus components (e.g., bender 20) so as to initiate an action by the one or more apparatus components (e.g., bender 20).

FIG. 1 also provides a view of an exemplary saw mandrel 1. Exemplary saw mandrel 1 has positioned thereon a plurality of saw blades 6 separated from one another by spacers 3. Large nuts and washers 2 are positioned on opposite sides of the plurality of blades 6 (and spacers 3) so as to lock blades 6 and spacers 3 in position along exemplary saw mandrel 1. As discussed further below, exemplary saw mandrel 1 extends through and rotates within bearings 4, which are connected to and supported by saw mandrel support structure 50. Exemplary saw mandrel motor 5 provides power to rotate exemplary saw mandrel 1 via saw mandrel belt 7 and saw mandrel sprocket 8 positioned along and connected to exemplary saw mandrel 1.

Figure 2:
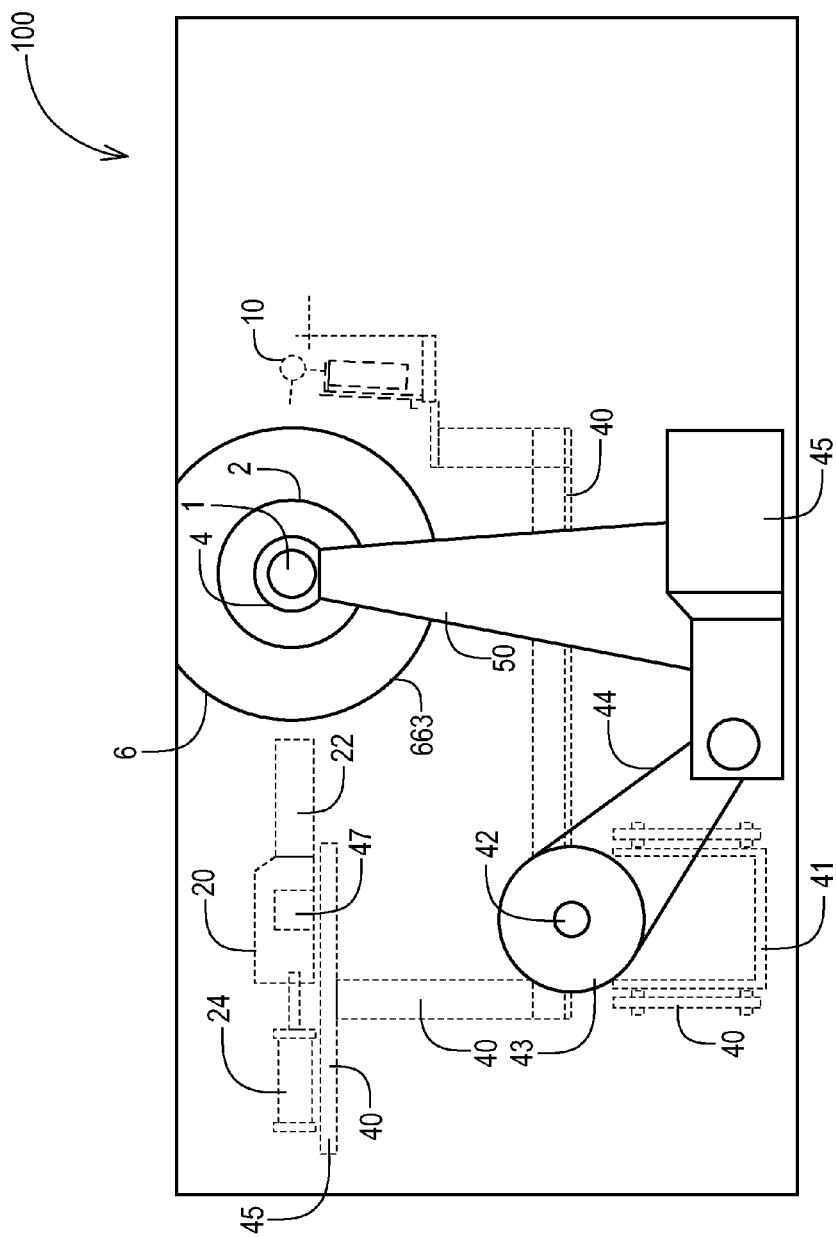
FIG. 2 depicts a side view of the exemplary apparatus shown in FIG. 1 as viewed from a right-hand side of the exemplary apparatus.

FIG. 2 provides a side view of exemplary apparatus 100 shown in FIG. 1 as viewed from a right-hand side of exemplary apparatus 100. As shown in FIG. 2, exemplary apparatus 100 further comprises a movable support member 40 that is movable along a ball screw 42. Movable support member 40 is operatively adapted and sized to (i) support gauge 10 and bender 20, and (ii) move along support member track 41 in response to rotation of ball screw 42 via ball screw sprocket 43, ball screw sprocket belt 44, and ball screw motor 45. It should be noted that although movable support member 40 and support member track 41 are shown as having a particular overall configuration, cross-sectional configuration, ball system, etc., movable support member 40 and support member track 41 may have any overall configuration, cross-sectional configuration, drive system, etc. as long as movable support member 40 is capable of (i) supporting gauge 10 and bender 20, and (ii) moving along support member track 41.

Figure 3B:
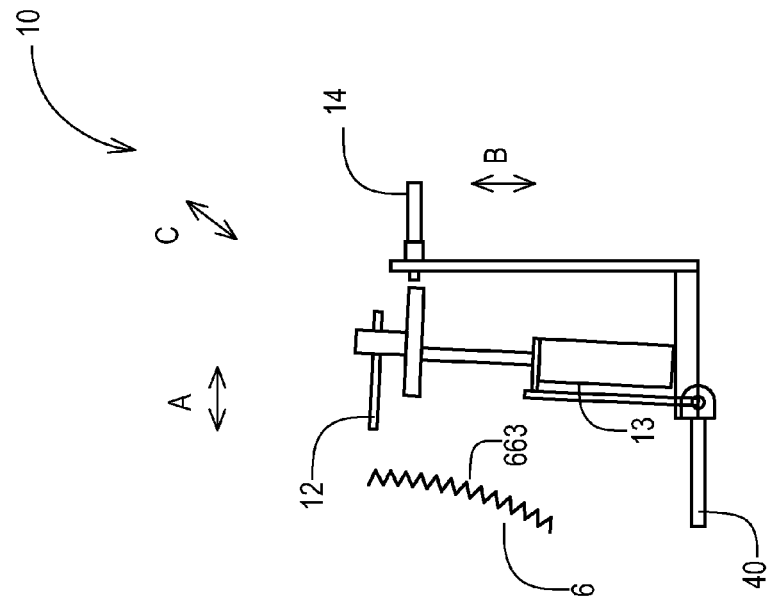
FIG. 3B depicts a side view of the exemplary gauge shown in FIG. 3A as viewed from a right-hand side of the exemplary gauge.
Figure 3A:
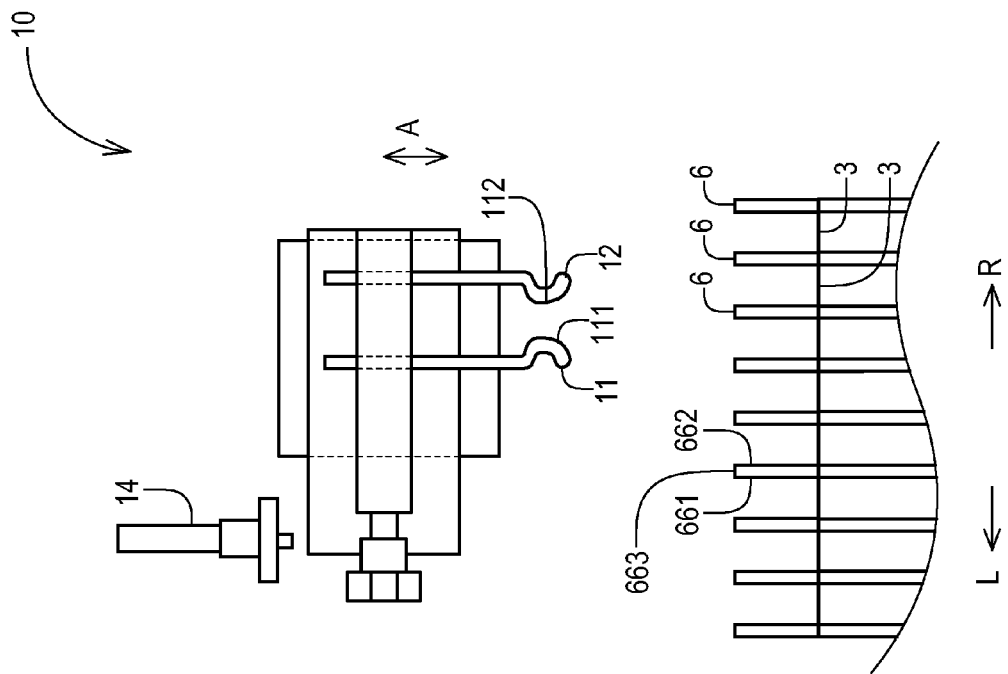
FIG. 3A depicts a top view of an exemplary gauge suitable for use in the exemplary apparatus shown in FIG. 1.

FIG. 3A depicts a top view of exemplary gauge 10 suitable for use in exemplary apparatus 100 shown in FIG. 1. Exemplary gauge 10 comprises left and right gauge contact members 11 and 12, respectively. Left and right gauge contact members 11 and 12 are spaced from one another so as to be positionable along opposite left and right major surfaces 661 and 662, respectively, of a saw blade 6 positioned along saw mandrel 1 such that teeth 663 of saw blade 6 are between the left and right gauge contact members 11 and 12. Exemplary gauge 10 further comprises a gauge positioner 13 (see, FIG. 3B) that is operatively adapted to move exemplary gauge 10 toward and away from a given saw blade 6. Exemplary gauge 10 also comprises a gauge position sensor 14 that is operatively adapted to detect a position of exemplary gauge 10 and optionally provide gauge position data to PLC 30.

FIG. 3B depicts a side view of exemplary gauge 10 shown in FIG. 3A as viewed from a right-hand side of exemplary gauge 10. As shown in FIG. 3B, in some embodiments, gauge positioner 13 may move exemplary gauge 10 toward and away from saw blade 6 in a direction as indicated by arrow A (i.e., in a direction having a horizontal direction component). In other embodiments, gauge positioner 13 may move exemplary gauge 10 toward and away from saw blade 6 in a direction as indicated by arrow B (i.e., in a direction having a vertical direction component). In other embodiments, gauge positioner 13 may move exemplary gauge 10 toward and away from saw blade 6 in a direction as indicated by arrow C (i.e., in a direction having both horizontal and vertical direction components).

In some desired embodiments, left and right gauge contact members 11 and 12 are each independently provided with an electrical current, and saw mandrel 1 and each saw blade 6 are also provided with an electrical current. In these desired embodiments, contact of a given saw blade 6 with left gauge contact member 11 of gauge 10 (i.e., contact of left major surface 661 of saw blade 6 with surface 111 of left gauge contact member 11; see, FIG. 3A) completes a first electrical circuit (i.e., running through saw mandrel 1 and given saw blade 6) and generates a first signal, while contact of given saw blade 6 with right gauge contact member 12 of gauge 10 (i.e., contact of right major surface 662 of saw blade 6 with surface 112 of right gauge contact member 12) completes a second electrical circuit and generates a second signal. Further, in these desired embodiments, PLC 30 is operatively adapted to receive the first and second signals, and in response to receiving the first signal, sending a first command to exemplary bender 20 so as to cause exemplary bender 20 to bend first saw blade 6 in the right direction (as shown by arrow R in FIG. 3A), and in response to receiving the second signal, sending a second command to exemplary bender 20 so as to cause exemplary bender 20 to bend first saw blade 6 in the left direction (as shown by arrow L in FIG. 3A).

Figure 4:
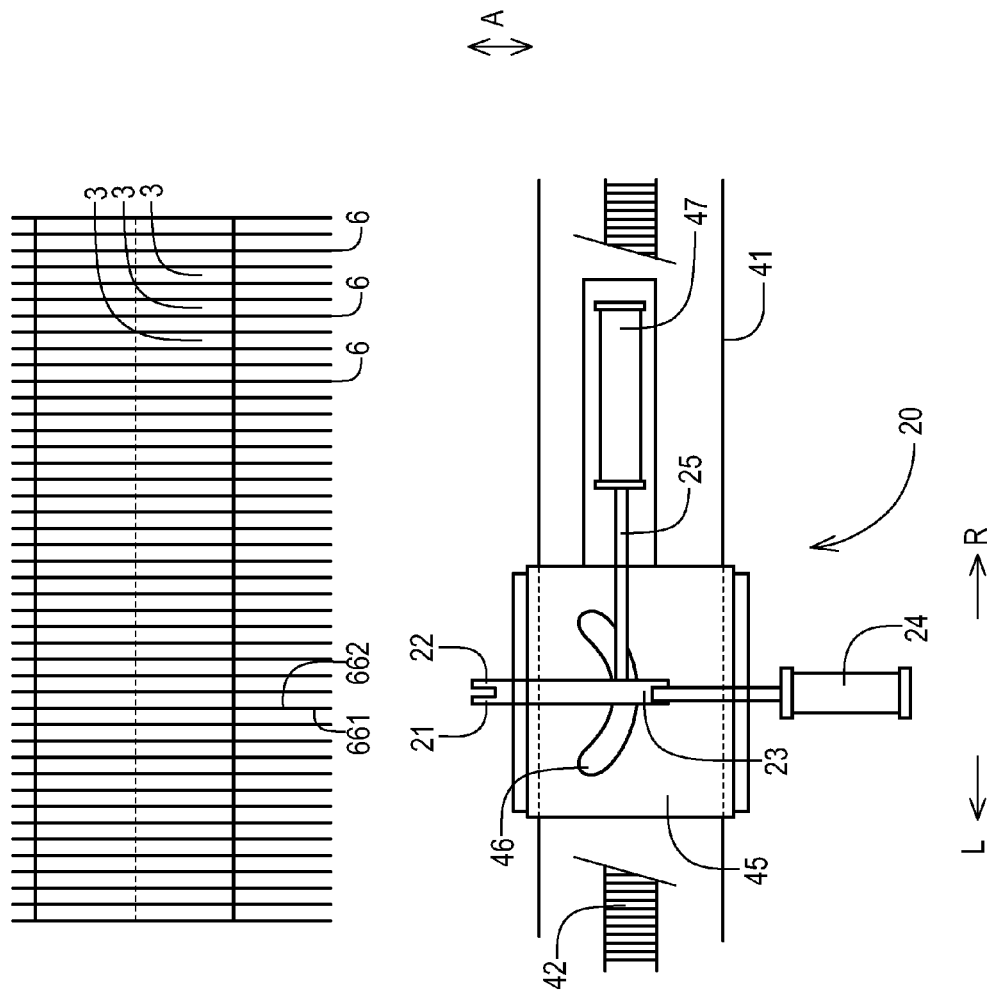
FIG. 4 depicts a top view of an exemplary bender suitable for use in the exemplary apparatus shown in FIG. 1.

FIG. 4 depicts a top view of exemplary bender 20 suitable for use in exemplary apparatus 100 shown in FIG. 1. As shown in FIG. 4, exemplary bender 20 comprises left and right bender contact members 21 and 22, respectively. Left and right bender contact members 21 and 22 are spaced from one another so as to be positionable along the opposite left and right major surfaces 661 and 662 of a given saw blade 6 such that teeth 663 of the given saw blade 6 are between left and right bender contact members 21 and 22. As discussed above, in response to saw blade 6 touching at least one of left and right gauge contact members 11 and 12 during rotation of saw mandrel 1, exemplary bender 20 (i) bends saw blade 6 in a right direction (as shown by arrow R in FIG. 4) if first saw blade touches left gauge contact member 11, and (ii) bend saw blade 6 in a left direction (as shown by arrow L in FIG. 4) if saw blade 6 touches right gauge contact member 12.

As further shown in FIG. 4, exemplary bender 20 also comprises bender member 23 positioned between (i) left and right bender contact members 21 and 22 and (ii) a bender positioner 24 that is operatively adapted to move exemplary bender 20 (i.e., left and right bender contact members 21 and 22 and bender member 23) toward and away from a given saw blade 6. Similar to gauge positioner 13 discussed above, in some embodiments, bender positioner 24 may move exemplary bender 20 toward and away from saw blade 6 in a direction as indicated by arrow A (i.e., in a direction having a horizontal direction component), while in other embodiments, bender positioner 24 may move exemplary bender 20 toward and away from saw blade 6 in a direction having a vertical direction component (as indicated by arrow B in FIG. 5B), and in other embodiments, bender positioner 24 may move exemplary bender 20 toward and away from saw blade 6 in a direction having both horizontal and vertical direction components.

As shown in FIG. 4, exemplary bender 20 further comprises a bender activator 25. Bender activator 25 is operatively adapted to receive a signal from PLC 30, and, in response to receiving the signal from PLC 30, moving (i) bender member 23 and (ii) left and right bender contact members 21 and 22 so as to bend a given saw blade 6. For example, bender activator 25 may exert a first moving force (e.g., a pushing force) onto bender member 23 so as to move bender member 23 in a left direction as shown by arrow L in FIG. 4. Movement of bender member 23 in a left direction causes left and right bender contact members 21 and 22 to bend a given saw blade 6 in a left direction. Bender activator 25 may also exert a second moving force (e.g., a pulling force) onto bender member 23 so as to move bender member 23 in a right direction as shown by arrow R in FIG. 4. Movement of bender member 23 in a right direction causes left and right bender contact members 21 and 22 to bend a given saw blade 6 in a right direction.

It should be understood that bender activator 25 may exert a first moving force (e.g., a pushing force) or a second moving force (e.g., a pulling force), wherein the amount of force for a given moving force differs from a previous or subsequent moving force. In other words, if a greater degree of bending of saw blade 6 in a given direction is needed, bender activator 25 may exert up to a maximum first moving force (e.g., a pushing force) or a maximum second moving force (e.g., a pulling force). At other times, a moving force less than a maximum moving force may be used by bender activator 25.

In addition, the force application time of a given moving force may vary from the force application time of a previous or subsequent moving force. In other words, if bending of saw blade 6 is needed over a greater length of saw blade 6, bender activator 25 may exert a first moving force (e.g., a pushing force) or a maximum second moving force (e.g., a pulling force) for a greater length of time (e.g., for 5 seconds versus 1 second).

Based on information received from exemplary gauge 10 (e.g., the detection of a first or second electrical circuit flowing through left and/or right gauge contact members 11 and 12; the length, for example, in seconds, of a given first or second electrical circuit detection signal, etc.), PLC 30 provides a signal to bender activator 25 that instructs bender activator 25 to provide a particular moving force and the duration of the particular moving force.

In one desired embodiment, as shown in FIG. 4, bender member 23 comprises a guide component (not shown) extending into a groove 46 within a guide plate 451. Guide plate 451 may comprise a separate component that is attached to movable support member 40 or may be an integral component of movable support member 40. In either case, groove 46 within guide plate 451 provides a path of movement for bender member 23 when forced in a right of left direction from a neutral position (i.e., a position substantially centered along groove 46 as shown in FIG. 4).

Further, it should be understood that bender activator 25 may comprise a single piston 47 for moving bender member 23 when forced in a right of left direction as shown in FIG. 4. However, in other embodiments, bender activator 25 may comprise more than one piston (or similar device for applying a moving force to bender member 23). For example, in one desired embodiment, two pistons are utilized, wherein one piston applies a pushing force so as to move bender member 23 in a left direction, and another piston applies a pulling force so as to move bender member 23 in a right direction.

FIG. 5A depicts a side view of exemplary gauge 10 shown in FIG. 3A and exemplary bender 20 shown in FIG. 4, both of which are supported by exemplary movable support member 40 that is movable along ball screw 42. As shown in FIG. 5A, in desired embodiments, exemplary bender 20 is positioned directly opposite exemplary gauge 10 relative to saw mandrel 1 such that any point along a given saw blade 6 that touches left or right gauge contact member 11 or 12 of exemplary gauge 10 travels 180° during rotation of saw mandrel 1 so as to be positioned between left and right bender contact members 21 and 22 of exemplary bender 20. As discussed further below, such a 180° separation between exemplary gauge 10 and exemplary bender 20 enables efficient communication and bending action between exemplary gauge 10 and exemplary bender 20 via PLC 30.

FIG. 5B depicts a rear view of exemplary movable support member 40 and ball screw 42 shown in FIG. 5A. As shown in FIG. 5B, exemplary movable support member 40 comprises a ball screw connection component 48 comprising teeth 49, which fit within grooves 421 (see, FIG. 6B) of ball screw 42 and enable movement of exemplary movable support member 40 along ball screw 42 in response to rotation of ball screw 42.

FIGS. 6A-6C provide details regarding movement of exemplary movable support member 40 along ball screw 42. FIG. 6A provides a side view of exemplary timing assembly components 60 suitable for use in exemplary apparatus 100 shown in FIG. 1. As shown in FIG. 6A, exemplary timing assembly components 60 comprise ball screw gear 61 positioned along ball screw 42; timing gear 62, which is in contact with and rotates along with ball screw gear 61; timing gear first position indicator 63; timing gear second position indicator 64; and timing gear shaft 68. Timing gear 62, timing gear first position indicator 63, and timing gear second position indicator 64 are each positioned along timing gear shaft 68, and each rotates along with timing gear shaft 68.

FIG. 6B depicts a top view of exemplary timing assembly components 60 shown in FIG. 6A. As shown in FIG. 6B, exemplary timing assembly components 60 further comprise timing gear first position indicator sensor 65, which senses a position of timing gear first position indicator 63; and timing gear second position indicator sensor 66, which senses a position of timing gear second position indicator 64.

FIG. 6C depicts a frontal view of exemplary timing assembly components 60 shown in FIG. 6A as viewed from a right-hand side of exemplary timing assembly components 60. As shown in FIG. 6C, exemplary timing assembly components 60 further comprise timing gear shaft support structure 67, and timing gear shaft bearings 69.

In operation, timing gear 62 and ball screw gear 61 are selected so that one rotation of timing gear 62 results in movement of exemplary movable support member 40 along ball screw 42 a distance equal to the spacing between adjacent saw blades 6 along saw mandrel 1. For example, if the distance between adjacent saw blades 6 along saw mandrel 1 is equal to 0.580 inches (in.), timing gear 62 and ball screw gear 61 are selected so that one rotation of timing gear 62 results in movement of exemplary movable support member 40 along ball screw 42 a distance equal to 0.580 in. (e.g., selection of timing gear 62 in the form of a 30 tooth gear and ball screw gear 61 in the form of a 87 tooth gear when used in combination with a 0.20 in. ball screw as discussed in the example below).

In order to detect one rotation of timing gear 62, timing gear first position indicator sensor 65 and timing gear second position indicator sensor 66 are utilized. In particular, the above-described gauging and bending steps take place when timing gear second position indicator 64 is aligned with timing gear second position indicator sensor 66. Once a given saw blade 6 is correctly aligned (i.e., no point along saw blade 6 touches any portion of either left and right gauge contact members 11 and 12), PLC 30 sends a signal to activate ball screw motor 45. Once ball screw motor 45 starts turning ball screw 42 at an activation speed, timing gear first position indicator 63 and timing gear second position indicator 64 begins to move. Once timing gear first position indicator 63 is detected by timing gear first position indicator sensor 65, PLC 30 sends a signal to ball screw motor 45 to decrease the rotational speed from an activation speed to an end rotation speed. Once timing gear second position indicator 64 is detected by timing gear second position indicator sensor 66, PLC 30 sends (1) a signal to ball screw motor 45 to stop, resulting in one complete revolution of timing gear 62 and movement of exemplary movable support member 40 a desired distance along ball screw 42, and subsequently (2) signals to gauge positioner 13 and bender positioner 24 to move exemplary gauge 10 and exemplary bender 20 toward another saw blade 6 for gauging and possible bending as discussed above.

In addition to the above-described components, exemplary apparatus 100 may further comprise additional components, as shown in FIG. 1, to monitor rotation of saw mandrel 1. As shown in FIG. 1, exemplary apparatus 100 further comprises a sprocket 70 coaxially positioned along saw mandrel 1, and a sprocket sensor 71 operatively adapted to detect a rotating position along sprocket 70 relative to sprocket sensor 71. For example, sprocket 70 may comprise sixteen sprocket teeth 72 equally spaced from one another along an outer perimeter of sprocket 70 (e.g., 360°/16 teeth=22.5 between each tooth 72). Sprocket sensor 71 is operatively adapted to detect (i) a position of a given tooth 72, and (ii) a rotational distance travelled by the given tooth 72 (i.e., in the form of how many teeth 72 have passed by sprocket sensor 71 between an initial time and a subsequent time).

Sprocket 70 and sprocket sensor 71 may be utilized to provide PLC 30 with information that can be used, along with the actual positioning of exemplary gauge 10 and exemplary bender 20, to initiate a bending force by exemplary bender 20 onto a specific point along a given saw blade 6. For example, in an embodiment wherein exemplary gauge 10 and exemplary bender 20 are positioned exactly 180° apart from one another, as discussed above, and sprocket 70 comprises 16 equally spaced sprocket teeth 72, once left gauge contact member 11 or right gauge contact member 12 is touched by a point X along a given saw blade 6 (i.e., point X is positioned between left gauge contact member 11 and right gauge contact member 12 of exemplary gauge 10), PLC 30 receives a signal from either left gauge contact member 11 or right gauge contact member 12, and a position of a given sprocket tooth 72 along sprocket 70. Sprocket sensor 71 then counts the number of sprocket teeth 72 that pass by sprocket sensor 71, and when sprocket sensor 71 detects the eighth sprocket tooth 72 (i.e., sprocket 70 and saw mandrel 1 have each travelled 180° since the point contact of saw blade 6 with left gauge contact member 11 or right gauge contact member 12), sprocket sensor 71 provides this information to PLC 30, and PLC 30 sends a signal to exemplary bender 20 to initiate a bending force at point X along a given saw blade 6.

It should be understood that sprocket 70 may comprise any desired number of sprocket teeth 72. For example, if sprocket 70 comprises 18 equally spaced sprocket teeth 72, each sprocket tooth 72 will be spaced from one another by 20°, and a rotational distance of 9 sprocket teeth 72 will represent a rotation of sprocket 70 and saw mandrel 1 of 180°. In another example, if sprocket 70 comprises 36 equally spaced sprocket teeth 72, each sprocket tooth 72 will be spaced from one another by 10°, and a rotational distance of 18 sprocket teeth 72 will represent a rotation of sprocket 70 and saw mandrel 1 of 180°.

As further noted above, if exemplary gauge 10 and exemplary bender 20 are positioned apart from one another at an angle other than 180°, for example, 90° from one another, and sprocket 70 comprises 16 equally spaced sprocket teeth 72, once left gauge contact member 11 or right gauge contact member 12 is touched by a point X along a given saw blade 6 (i.e., point X is positioned between left gauge contact member 11 and right gauge contact member 12 of exemplary gauge 10), PLC 30 receives a signal from either left gauge contact member 11 or right gauge contact member 12, and a position of a given sprocket tooth 72 along sprocket 70. Sprocket sensor 71 then counts the number of sprocket teeth 72 that pass by sprocket sensor 71, and when sprocket sensor 71 detects the fourth sprocket tooth 72 (i.e., sprocket 70 and saw mandrel 1 have each travelled 90° since the point contact of saw blade 6 with left gauge contact member 11 or right gauge contact member 12), sprocket sensor 71 provides this information to PLC 30, and PLC 30 sends a signal to exemplary bender 20 to initiate a bending force at point X along a given saw blade 6.

As discussed above, apparatus for automatically training saw blades along a saw mandrel of the present invention comprise a number of components that enable automatic and efficient training of saw blades along a saw mandrel. As discussed above, suitable components for the disclosed apparatus of the present invention include, but are not limited to:

a gauge (e.g., gauge 10) comprising left and right gauge contact members (e.g., left and right gauge contact members 11 and 12), the left and right gauge contact members being spaced from one another so as to be positionable along opposite left and right major surfaces of a first saw blade (e.g., saw blade 6) positioned along a saw mandrel (e.g., saw mandrel 1) such that teeth of the first saw blade (e.g., saw blade teeth 663) are between the left and right gauge contact members;

a bender (e.g., bender 20) comprising left and right bender contact members (e.g., left and right bender contact members 21 and 22,), the left and right bender contact members being spaced from one another so as to be positionable along the opposite left and right major surfaces of the first saw blade (e.g., saw blade 6) such that teeth of the first saw blade (e.g., saw blade teeth 663) are between the left and right bender contact members, one or more apparatus components (e.g., gauge positioner 13 and bender positioner 24) operatively adapted to move the gauge (e.g., gauge 10) and the bender (e.g., bender 20) toward or away from the first saw blade (e.g., exemplary saw blade 6);

a support structure (e.g., saw mandrel support structure 50) operatively adapted to support and allow rotation of a saw mandrel (e.g., saw mandrel 1);

a first motor (e.g., saw mandrel motor 5) and associated connecting components (e.g., saw mandrel belt 7 and saw mandrel sprocket 8) operatively adapted to rotate the saw mandrel (e.g., saw mandrel 1) when positioned within the support structure (e.g., saw mandrel support structure 50);

a ball screw (e.g., ball screw 42) extending parallel to the saw mandrel (e.g., saw mandrel 1) when positioned within the support structure (e.g., saw mandrel support structure 50);

a second motor (e.g., ball screw motor 45) and associated connecting components (e.g., ball screw sprocket 43, and ball screw sprocket belt 44) operatively adapted to rotate the ball screw (e.g., ball screw 42);

a movable support structure (e.g., movable support member 40) operatively adapted to (i) support the gauge (e.g., gauge 10) and the bender (e.g., bender 20), and (ii) move along the ball screw (e.g., ball screw 42);

a first gear (e.g., ball screw gear 61) coaxially positioned along the ball screw (e.g., ball screw 42);

a second gear (e.g., timing gear 62) in rotationable contact with the first gear (e.g., ball screw gear 61);

at least one gear sensor (e.g., timing gear first position indicator sensor 65, and timing gear second position indicator sensor 66) operatively adapted to detect a position of the second gear (e.g., timing gear 62), wherein one complete rotation of the second gear (e.g., timing gear 62) moves the movable support structure (e.g., movable support member 40) a distance along the ball screw (e.g., ball screw 42) equal to a spacing between adjacent saw blades (e.g., adjacent saw blades 6);

a sprocket (e.g., sprocket 70) coaxially positioned along the saw mandrel (e.g., saw mandrel 1);

a sprocket sensor (e.g., sprocket sensor 71) operatively adapted to detect a rotating position along the sprocket (e.g., sprocket 70) relative to the sprocket sensor (e.g., sprocket sensor 71);

an electrical current (not shown) through the saw mandrel (e.g., saw mandrel 1) such that (i) contact of the first saw blade (e.g., saw blade 6) with the left gauge contact member (e.g., left gauge contact member 11) of the gauge (e.g., gauge 10) completes a first circuit and generates a first signal, and (ii) contact of the first saw blade (e.g., saw blade 6) with the right gauge contact member (e.g., right gauge contact member 12) of the gauge (e.g., gauge 10) completes a second circuit and generates a second signal; and a programmable logic controller (e.g., PLC 30) operatively adapted to receive the first and second signals (i.e., regarding contact of saw blade 6 with left gauge contact member 11 or right gauge contact member 12), and in response to receiving the first signal, sending a first command to the bender (e.g., bender 20) so as to cause the bender to bend the first saw blade in the right direction, and in response to receiving the second signal, sending a second command to the bender so as to cause the bender to bend the first saw blade in the left direction.

The present invention is further directed to methods of automatically training saw blades along a saw mandrel so as to eliminate the inefficient, time-consuming, and inaccurate process of manually training saw blades along a saw mandrel. The disclosed methods of automatically training saw blades along a saw mandrel may utilize one or more apparatus components as shown in FIGS. 1-6C and as discussed above.

The disclosed methods of automatically training saw blades along a saw mandrel may comprise one or more steps so as to enable the disclosed automatic saw trainer to go to a correct starting position, rotate the saw mandrel (e.g., saw mandrel 1), check the entire 360° of a given saw blade (e.g., saw blade 6) with a sensor (e.g., gauge 10), and automatically correct any places on the blade that are out of tolerance (e.g., via bender 20). The procedure is repeated until each saw blade along a given saw mandrel has been checked and corrected.

In one exemplary embodiment, the present invention is directed to a method of automatically training saw blades along a saw mandrel, wherein the method comprises positioning a gauge (e.g., gauge 10) relative to a first saw blade (e.g., saw blade 6) along a saw mandrel (e.g., saw mandrel 1) such that left and right gauge contact members (e.g., left and right gauge contact members 11 and 12) of the gauge extend along opposite left and right major surfaces (e.g., left and right major surfaces 661 and 662) of the first saw blade (e.g., saw blade 6), and teeth (e.g., teeth 663) of the first saw blade (e.g., saw blade 6) are between the left and right gauge contact members; and in response to the first saw blade touching at least one of the left and right gauge contact members during rotation of the saw mandrel, bending the first saw blade (e.g., via bender 20) in a right direction if the first saw blade touches the left gauge contact member, and bending the first saw blade in a left direction if the first saw blade touches the right gauge contact member.

The disclosed methods of automatically training saw blades along a saw mandrel may further comprise one or more additional steps including, but not limited to:

positioning a bender (e.g., bender 20) relative to the first saw blade (e.g., saw blade 6) such that left and right bender contact members (e.g., left and right bender contact members 21 and 22) of the bender extend along the opposite left and right major surfaces (e.g., left and right major surfaces 661 and 662) of the first saw blade, and teeth (e.g., teeth 663) of the first saw blade are between the left and right bender contact members; and rotating the saw mandrel (e.g., saw mandrel 1), for example, via a saw mandrel motor (e.g., saw mandrel motor 5);

in response to the first saw blade (e.g., saw blade 6) not touching the left or right gauge contact members (e.g., left and right gauge contact members 11 and 12) during at least one complete rotation of the saw mandrel (e.g., saw mandrel 1), moving the gauge (e.g., gauge 10) and the bender (e.g., bender 20) away from the first saw blade (e.g., saw blade 6) such that the left and right gauge contact members (e.g., left and right gauge contact members 11 and 12) of the gauge (e.g., gauge 10) and the left and right bender contact members (e.g., left and right bender contact members 21 and 22) of the bender (e.g., bender 20) do not extend along the opposite left and right major surfaces (e.g., left and right major surfaces 661 and 662) of the first saw blade, and subsequently, moving the gauge (e.g., gauge 10) and the bender (e.g., bender 20) along the saw mandrel (e.g., saw mandrel 1) a distance equal to a correct spacing between adjacent saw blades (e.g., adjacent saw blades 6);

moving the gauge (e.g., gauge 10) and the bender (e.g., bender 20) toward a second saw blade (e.g., another, adjacent saw blade 6) of the saw mandrel (e.g., saw mandrel 1) such that the left and right gauge contact members (e.g., left and right gauge contact members 11 and 12) of the gauge (e.g., gauge 10) and the left and right bender contact members (e.g., left and right bender contact members 21 and 22) of the bender (e.g., bender 20) extend along opposite left and right major surfaces (e.g., left and right major surfaces 661 and 662) of the second saw blade; and in response to the second saw blade (e.g., saw blade 6) touching at least one of the left and right gauge contact members (e.g., at least one of left and right gauge contact members 11 and 12) during rotation of the saw mandrel (e.g., saw mandrel 1), bending the second saw blade (e.g., saw blade 6) (i.e., via bender 20) in a right direction if the second saw blade touches the left gauge contact member, and bending the second saw blade in a left direction if the second saw blade touches the right gauge contact member.

In some desired embodiments, the method of the present invention further comprise the steps of: providing an electrical current through the saw mandrel (e.g., saw mandrel 1) and the left and right gauge contact members (e.g., left and right gauge contact members 11 and 12) of the gauge (e.g., gauge 10) such that (i) contact of the first saw blade (e.g., saw blade 6) with the left gauge contact member of the gauge completes a first circuit and send a first signal to a programmable logic controller (e.g., PLC 30), and (ii) contact of the first saw blade with the right gauge contact member of the gauge completes a second circuit and send a second signal to the programmable logic controller; and in response to the programmable logic controller receiving the first signal, sending a first command to the bender (e.g., bender 20) so as to cause the bender to bend the first saw blade (e.g., saw blade 6) in the right direction, and in response to the programmable logic controller receiving the second signal, sending a second command to the bender so as to cause the bender to bend the first saw blade in the left direction.

As discussed above, in some desired embodiments, the methods of the present invention comprise positioning the gauge (e.g., gauge 10) and bender (e.g., bender 20) in strategic positions relative to one another, and relative to a saw mandrel (e.g., saw mandrel 1) being trained. In one desired method, the bender (e.g., bender 20) is positioned directly opposite the gauge (e.g., gauge 10) relative to the saw mandrel (e.g., saw mandrel 1) such that any point along the first saw blade (e.g., saw blade 6) that touches the left or right gauge contact member (e.g., the left or right gauge contact member 11 or 12) of the gauge (e.g., gauge 10) travels 180° during rotation of the saw mandrel so as to be positioned between the left and right bender contact members (e.g., left and right bender contact members 21 and 22) of the bender (e.g., bender 20).

The present invention is also directed to methods of automatically training saw blades (e.g., saw blades 6) along a saw mandrel (e.g., saw mandrel 1), wherein the method comprises: rotating a saw mandrel (e.g., saw mandrel 1) comprising multiple saw blades (e.g., saw blades 6) spaced from one another along the saw mandrel; and in response to a first saw blade not touching left or right gauge contact members (e.g., left or right gauge contact member 11 or 12) of a gauge (e.g., gauge 10) during at least one complete rotation of the saw mandrel and while the gauge (e.g., gauge 10) is in an activated position (e.g., when teeth 663 of a given saw blade are positioned between left and right gauge contact members 11 and 12 of gauge 10), moving the gauge (e.g., gauge 10) into a deactivated position (e.g., as shown in FIG. 1) via a programmable logic controller (e.g., PLC 30); and subsequently moving the gauge (e.g., gauge 10) and a bender (e.g., bender 20) along the saw mandrel (e.g., saw mandrel 1) a distance equal to a spacing between adjacent saw blades (e.g., adjacent saw blades 6) via the programmable logic controller (e.g., PLC 30).

The disclosed methods of automatically training saw blades (e.g., saw blades 6) along a saw mandrel (e.g., saw mandrel 1) may further comprises additional steps including, but not limited to: in response to the first saw blade (e.g., first saw blade 6) touching at least one of the left and right gauge contact members of the gauge (e.g., at least one of left and right gauge contact members 11 and 12 of gauge 10) during rotation of the saw mandrel (e.g., saw mandrel 1) and while the gauge is in an activated position (e.g., when teeth 663 of a given saw blade are positioned between left and right gauge contact members 11 and 12 of gauge 10), bending the first saw blade (e.g., first saw blade 6) in a right direction if the first saw blade touches the left gauge contact member (e.g., left gauge contact member 11), and bending the first saw blade in a left direction if the first saw blade touches the right gauge contact member (e.g., right gauge contact member 12); positioning the gauge (e.g., gauge 10) relative to the first saw blade (e.g., first saw blade 6) along the saw mandrel (e.g., saw mandrel 1) such that the left and right gauge contact members of the gauge (e.g., left and right gauge contact members 11 and 12 of gauge 10) extend along opposite left and right major surfaces (e.g., left and right major surfaces 661 and 662) of the first saw blade, and teeth (e.g., teeth 663) of the first saw blade are between the left and right gauge contact members (e.g., left and right gauge contact members 11 and 12 of gauge 10); and positioning a bender (e.g., bender 20) relative to the first saw blade (e.g., first saw blade 6) such that left and right bender contact members (e.g., left and right bender contact members 21 and 22) of the bender (e.g., bender 20) extend along the opposite left and right major surfaces (e.g., left and right major surfaces 661 and 662) of the first saw blade, and teeth (e.g., teeth 663) of the first saw blade are between the left and right bender contact members.

Figure 7A:
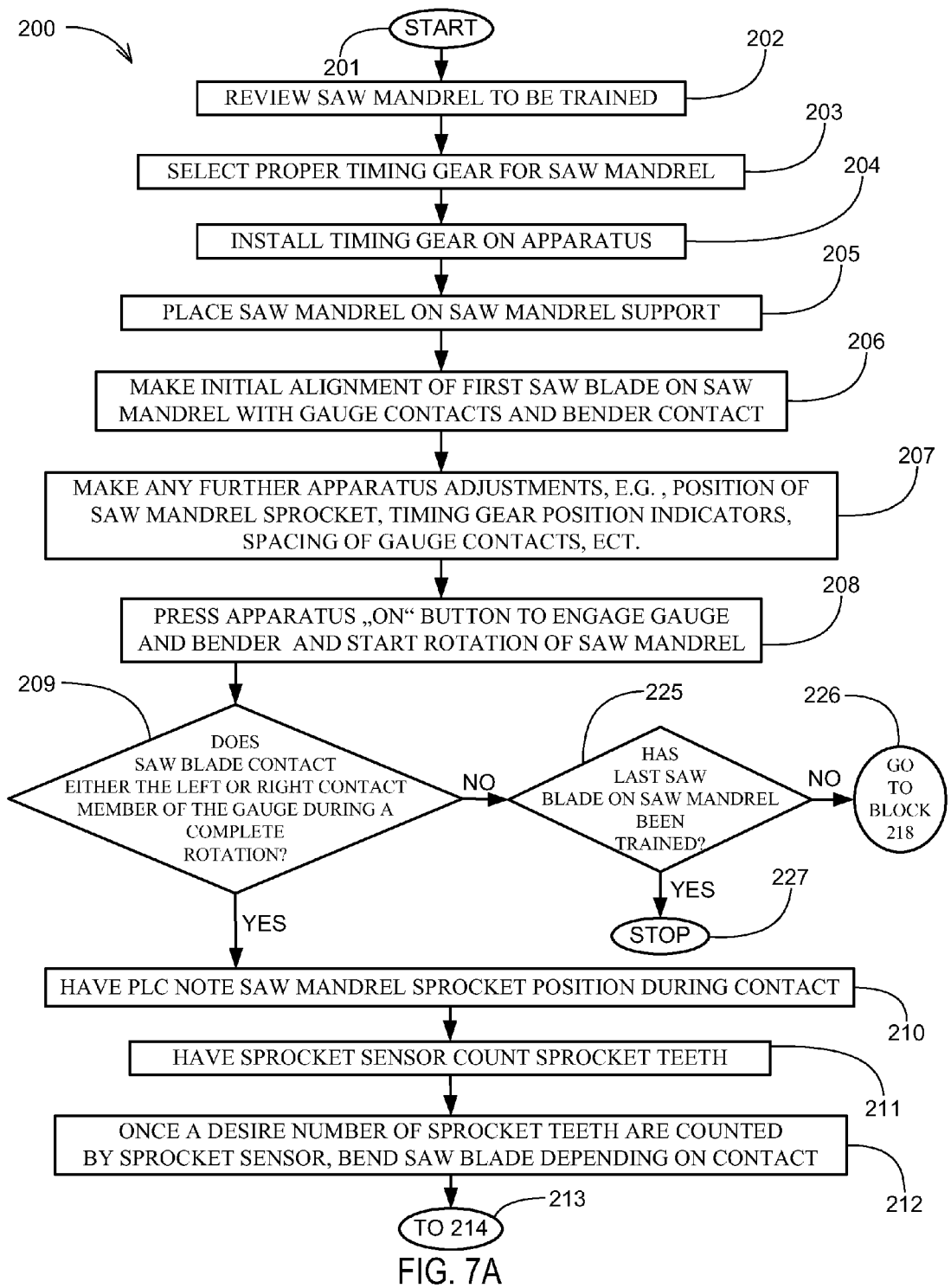
FIGS. 7A-7B depict a flowchart detailing exemplary steps suitable for use in the disclosed methods of automatically training saw blades along a saw mandrel.
Figure 7B:
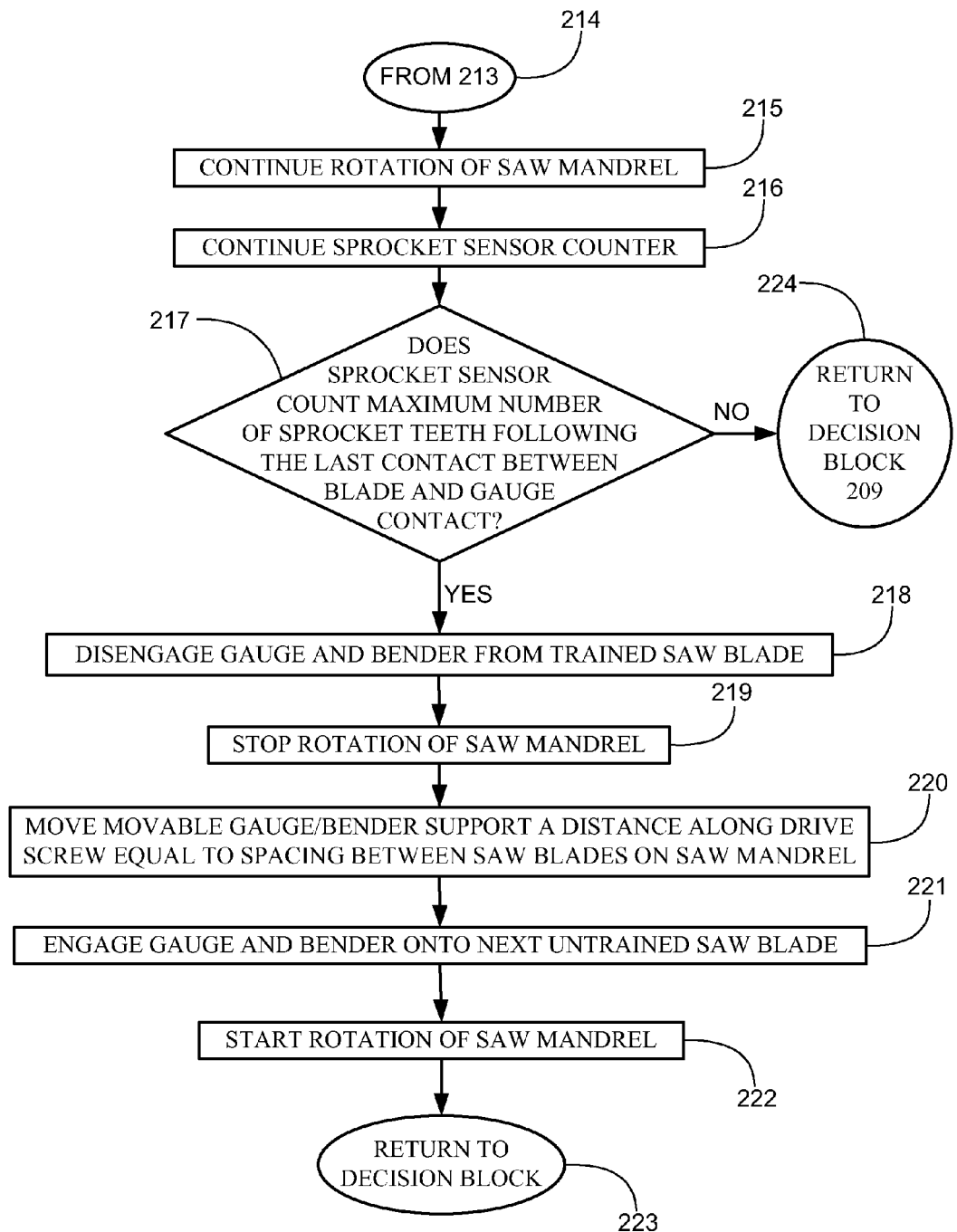

FIGS. 7A-7B depict a flowchart detailing exemplary steps suitable for use in the disclosed methods of automatically training saw blades along a saw mandrel. It should be noted that methods of automatically training saw blades along a saw mandrel of the present invention may include one or more of the exemplary method steps shown in FIGS. 7A-7B, and that the combination of steps shown in FIGS. 7A-7B represents one example of a suitable combination of steps in the disclosed methods of the present invention.

As shown in FIG. 7A, exemplary method 200 starts at start block 201 and proceeds to step 202, wherein the saw mandrel (e.g., saw mandrel 1) to be trained is reviewed. In this step, various parameters defining the saw mandrel may be determined and inputted into a programmable logic controller such as PLC 30. Saw mandrel parameters may include, but are not limited to, the overall length of the saw mandrel, the total number of saw blades (e.g., saw blades 6) on the saw mandrel, the spacing between adjacent saw blades, the overall diameter of each saw blade, the overall diameter of spacers (e.g., spacers 3) positioned between adjacent saw blades, etc.

From step 202, exemplary method 200 proceeds to step 203, wherein the proper timing gear (e.g., timing gear 62) is selected for the saw mandrel (e.g., saw mandrel 1) and the particular ball screw (e.g., ball screw 42) used on the apparatus (e.g., apparatus 100). As discussed above, the step of selecting a proper timing gear (e.g., timing gear 62) comprises matching (i) a ball screw gear (e.g., ball screw gear 61) and (ii) a ball screw (e.g., ball screw 42) of a given apparatus (e.g., apparatus 100) with a timing gear (e.g., timing gear 62) so that one complete rotation of the timing gear (e.g., timing gear 62) results in movement of a movable gauge/bender support (e.g., movable gauge/bender support 40) along the ball screw (e.g., ball screw 42) a distance equal to the distance between adjacent saw blades (e.g., saw blades 6) along the saw mandrel (e.g., saw mandrel 1). (See the example above wherein the distance between adjacent saw blades 6 along saw mandrel 1 is equal to 0.580 in., timing gear 62 is selected in the form of a 30 tooth gear to match (i) ball screw gear 61 in the form of an 87 tooth gear and (ii) a 0.20 in. ball screw. See also, the example below.)

From step 203, exemplary method 200 proceeds to step 204, wherein the proper timing gear (e.g., timing gear 62) is installed on a given apparatus (e.g., apparatus 100) so as to match the ball screw gear (e.g., ball screw gear 61) and the ball screw (e.g., ball screw 42) of the given apparatus (e.g., apparatus 100). From step 204, exemplary method 200 proceeds to step 205, wherein the saw mandrel is positioned onto the saw mandrel support (e.g., saw mandrel support 50) of the apparatus (e.g., apparatus 100).

From step 205, exemplary method 200 proceeds to step 206, wherein an initial alignment of a first untrained saw blade with a position of a movable gauge/bender support (e.g., movable gauge/bender support 40) along the ball screw (e.g., ball screw 42) is made. This initial alignment step may comprise one or more of the following step components: manually aligning the movable gauge/bender support (e.g., movable gauge/bender support 40) with the first untrained saw blade; engaging the gauge and bender so as to be positioned in the above-described activated position; manually rotating the saw mandrel while simultaneously making fine adjustments in the position of the movable gauge/bender support (e.g., movable gauge/bender support 40) so as to position the first untrained saw blade in a central location between contact members of the gauge; and, following any fine-tune position adjustments, disengaging the gauge and bender so as to be positioned in the above-described deactivated position.

From step 206, exemplary method 200 proceeds to step 207, wherein any further apparatus adjustments are made. For example, in this step, the following adjustments may be made: adjusting a position of the saw mandrel sprocket (e.g., sprocket 70) so as to align a given tooth (e.g., sprocket tooth 72) of the saw mandrel sprocket (e.g., sprocket 70) with the sprocket sensor (e.g., sprocket sensor 71); adjusting a position of one or more timing gear position indicators (e.g., timing gear position indicators 63 and 64) and/or timing gear 62 so as to align one or more timing gear position indicators (e.g., timing gear position indicator 63 and/or 64) with one or more timing gear position indicator sensors (e.g., timing gear first position indicator sensor 65 and/or timing gear second position indicator sensor 66); and adjusting a spacing between gauge contact members (e.g., the spacing between surface 111 of left gauge contact member 11 and surface 112 of right gauge contact member 12 shown in FIG. 3A).

From step 207, exemplary method 200 proceeds to step 208, wherein the apparatus "on" button is pushed. In this step, the gauge (e.g., gauge 10) and bender (e.g., bender 20) are moved from a deactivated position (i.e., positioned away from a given saw blade) to an activated position (i.e., positioned adjacent to a given saw blade so as to measure straightness of the given saw blade), and rotation of the saw mandrel is initiated. It should be understood that this step may involve pushing multiple "on" buttons so as to initiate one or more of (1) activation of the gauge (e.g., gauge 10), (2) activation of the bender (e.g., bender 20), and (3) initiation of rotation of the saw mandrel.

From step 208, exemplary method 200 proceeds to decision block 209, wherein a determination is made whether any portion of the saw blade comes into contact with either of the left or the right contact member of the gauge (e.g., either of left and right gauge contact members 11 and 12). If a determination is made that any portion of the saw blade comes into contact with either of the left or the right contact member of the gauge (e.g., either of left and right gauge contact members 11 and 12), exemplary method 200 proceeds from decision block 209 to step 210, wherein the programmable logic controller (e.g., PLC 30) notes the contact position along the saw blade (i.e., the point along the saw blade that comes into contact with the left or the right contact member of the gauge) via the saw mandrel sprocket position (e.g., the position of a specific tooth 72 on sprocket 70).

From step 210, exemplary method 200 proceeds to step 211, wherein the saw mandrel sprocket sensor (e.g., sprocket sensor 71) counts sprocket teeth following saw blade contact so as to monitor the number of sprocket teeth that pass saw mandrel sprocket sensor after the saw blade contact (e.g., sprocket sensor 71 monitors that position of the specific tooth 72 on sprocket 70 that corresponds to the location along the saw blade that came into contact with a gauge contact member).

From step 211, exemplary method 200 proceeds to step 212, wherein once a desired number of sprocket teeth are counted by the saw mandrel sprocket sensor (e.g., sprocket sensor 71), the programmable logic controller (e.g., PLC 30) instructs the bender (e.g., bender) to bend the saw blade (e.g., at the location along the saw blade that came into contact with a gauge contact member). The specific degree of bending and direction of bending will depend on a number of factors including, but not limited to, which gauge contact was contacted by the saw blade, prior bending movements stored in the memory of the programmable logic controller (e.g., PLC 30), etc.

From step 212, exemplary method 200 proceeds to block 213, wherein exemplary method 200 proceeds to block 214 shown in FIG. 7B. From block 214, exemplary method 200 proceeds to step 215, wherein rotation of the saw mandrel is continued following a momentary stoppage for the bending step. It should be noted that typically, the bending force utilized to bend a given saw blade exceeds a rotational force on the saw blade, resulting in a temporary stoppage of the saw blade during bending. In other embodiments, the programmable logic controller (e.g., PLC 30) may instruct a given apparatus to stop rotation of the saw mandrel prior to any bending step.

From step 215, exemplary method 200 proceeds to block 216, wherein the sprocket sensor (e.g., sprocket sensor 71) continues to count sprocket teeth (e.g., sprocket teeth 72) as the sprocket teeth move past the sprocket sensor. The total count of sprocket teeth (e.g., sprocket teeth 72) that pass by the sprocket sensor (e.g., sprocket sensor 71) is provided to the programmable logic controller (e.g., PLC 30) and utilized as discussed below.

From step 216, exemplary method 200 proceeds to decision block 217, wherein a determination is made whether the sprocket sensor (e.g., sprocket sensor 71) has counted a maximum number of sprocket teeth (e.g., the total number of sprocket teeth 72 on a given sprocket 70) following the last contact between a position on the saw blade and either of the gauge contact members (e.g., either of left and/or right gauge contact members 11 and 12). If a determination is made that the sprocket sensor (e.g., sprocket sensor 71) has counted a maximum number of sprocket teeth (e.g., the total number of sprocket teeth 72 on a given sprocket 70) following the last contact between a position on the saw blade and either of the gauge contact members (e.g., either of left and/or right gauge contact members 11 and 12), exemplary method 200 proceeds from decision block 217 to step 218, wherein the programmable logic controller (e.g., PLC 30) instructs the gauge (e.g., gauge 10) and the bender (e.g., bender 20) to disengage from the trained saw blade (i.e., return to the deactivated position).

From step 218, exemplary method 200 proceeds to step 219, wherein the programmable logic controller (e.g., PLC 30) instructs the saw mandrel motor (e.g., saw mandrel motor 5) to stop, causing rotation of the saw mandrel (e.g., saw mandrel 1) to stop. From step 219, exemplary method 200 proceeds to step 220, wherein the programmable logic controller (e.g., PLC 30) instructs the ball screw motor (e.g., ball screw motor 45) to start, causing movable gauge/bender support member (e.g., movable support member 40) to move along the ball screw (e.g., ball screw 42). As discussed above, in this step, movable gauge/bender support member (e.g., movable support member 40) moves along the ball screw (e.g., ball screw 42) a distance equal to the spacing between adjacent saw blades.

Although not shown in FIG. 7B, step 220 may comprise multiple mini-steps including, but not limited to, sensing a position of a first timing gear position indicator (e.g., timing gear first position indicator 63) via a first position indicator sensor (e.g., first position indicator sensor 65); sensing a position of a second timing gear position indicator (e.g., timing gear second position indicator 64) via a second position indicator sensor (e.g., second position indicator sensor 66); providing sensor information from first and/or second position indicator sensors to the programmable logic controller (e.g., PLC 30); and sending instructions from the programmable logic controller (e.g., PLC 30) to the ball screw motor (e.g., ball screw motor 45) to stop upon one complete rotation of a timing gear (e.g., timing gear 62) as monitored by the first and/or second position indicator sensors (e.g., first and/or second position indicator sensors 65 and 66).

From step 220, exemplary method 200 proceeds to step 221, wherein the programmable logic controller (e.g., PLC 30) instructs the gauge (e.g., gauge 10) and the bender (e.g., bender 20) to move from a deactivated position into an activated position so as to engage with the next saw blade to be trained. From step 221, exemplary method 200 proceeds to step 222, wherein the programmable logic controller (e.g., PLC 30) instructs the saw mandrel motor (e.g., saw mandrel motor 5) to start, causing the saw mandrel (e.g., saw mandrel 1) to rotate.

From step 222, exemplary method 200 proceeds to step 223, wherein exemplary method 200 returns to decision block 209 of FIG. 7A, and proceeds as discussed herein.

Returning to decision block 217 (shown in FIG. 7B), if a determination is made that the sprocket sensor (e.g., sprocket sensor 71) has not counted a maximum number of sprocket teeth (e.g., the total number of sprocket teeth 72 on a given sprocket 70) following the last contact between a position on the saw blade and either of the gauge contact members (e.g., either of left and/or right gauge contact members 11 and 12), exemplary method 200 proceeds from decision block 217 to step 224, wherein exemplary method 200 returns to decision block 209 of FIG. 7A, and proceeds as discussed herein.

Returning to decision block 209 (shown in FIG. 7A), if a determination is made that any portion of the saw blade does not comes into contact with either of the left or the right contact member of the gauge (e.g., either of left and right gauge contact members 11 and 12), exemplary method 200 proceeds from decision block 209 to decision block 225, wherein a determination is made whether the last saw blade on the saw mandrel has been trained. If a determination is made that the last saw blade on the saw mandrel has not been trained, exemplary method 200 proceeds from decision block 225 to step 226, wherein exemplary method 200 proceeds to step 218 of FIG. 7B, and proceeds as discussed herein.

Returning to decision block 225 (shown in FIG. 7A), if a determination is made that the last saw blade on the saw mandrel has been trained, exemplary method 200 proceeds from decision block 225 to step 227, wherein exemplary method 200 stops.

The present invention is also directed to method of making the above-described apparatus for automatically training saw blades along a saw mandrel. Any conventional step may be used to form a given component of the apparatus (e.g., a thermoforming or machining step to form a metal component). A combination of conventional steps and new method steps are utilized to form the above-described apparatus for automatically training saw blades along a saw mandrel. Suitable method steps include, but are not limited to, forming any component via one or more molding/thermoforming/shaping/machining step; assembling various components with one another to form a gauge (e.g., gauge 10); assembling various components with one another to form a bender (e.g., bender 20); assembling various components with one another to form a saw mandrel support structure (e.g., saw mandrel support structure 50); assembling various components with one another to form a timing assembly (e.g., timing assembly components 60); assembling various components with one another to form saw mandrel sprocket and sprocket sensor (e.g., sprocket 70 and sensor 71); programming the programmable logic controller (e.g., PLC 30) to receive signals from various apparatus components and send instructions to various apparatus components as discussed above; connect all of the apparatus components with one another; providing one or more sources of electricity to (i) power the apparatus, and (ii) provide an electrical current through the saw mandrel as discussed above; and connect the complete apparatus to the source of electricity.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Training of Saw Blades on a Saw Mandrel

An exemplary apparatus as shown in FIGS. 1-6C was prepared using multiple method steps (e.g., one or more assembling steps, etc) as described above.

The automatic saw trainer comprised a 0.2 ball screw (i.e., ball screw 42) so that for every 360° turn of the ball screw, the ball screw provided 0.2 inches of linear travel along the ball screw. To match the spacing between saw blades on the saw mandrel to be trained, namely, a spacing of 0.580 in., the gear ratio was changed to obtain a 2.9 gear ratio (i.e., 2.9×0.2 inches per revolution of the ball screw=0.580 in.). As a result, one turn of the timing gear (e.g., timing gear 62) resulted to movement of the movable gauge/bender support member (e.g., movable support member 40) a distance of 0.580 in. along the ball screw (e.g., ball screw 42). In particular, an 87 tooth gear was used as the ball screw gear (e.g., ball screw gear 61) and a 30 tooth gear was used as the timing gear (e.g., timing gear 62) (i.e., 87/30=2.9). (It should be noted that any combination of ball screw gear (e.g., ball screw gear 61) and timing gear (e.g., timing gear 62) could have been used as long as the gear combination resulted in a gear ratio of 2.9 for this particular saw blade spacing, i.e., 0.580 in. For a mandrel with a different saw blade spacing, the gear ratio would need to be changed to match the saw blade spacing as discussed above.)

The ball screw (e.g., ball screw 42) was powered by a ¾ dc horsepower motor (e.g., ball screw motor 45). Timing gear position indicators and timing gear position indicator sensors, such as timing gear first position indicator 63, timing gear first position indicator sensor 65, timing gear second position indicator sensor 66, and timing gear second position indicator sensor 66, in combination with a programmable logic controller (e.g., PLC 30), were used to control the speed and the start/stop of the ball screw motor (e.g., ball screw motor 45). The dc ball for this motor was 120 volts AC so a standard wall socket was used to supply power to the entire machine.

Contact sensors (e.g., left and right gauge contact members 11 and 12) were used to identify any segment of a given saw blade (e.g., saw blade 6) that was out of tolerance. A negative 24 volt signal was applied to the frame of the saw trainer (e.g., saw mandrel support structure 50), which was transmitted to the entire mandrel (e.g., saw mandrel 1) through contact. Each prong of the gauge (e.g., left and right gauge contact members 11 and 12) had an electrically-conductive wire attached thereto with each wire leading to one side of a coil on a 24 relay. One relay was used to sense touching on one side of the gauge (e.g., left gauge contact member 11) and another relay signaled a touch on the other side of the gauge (e.g., right gauge contact member 12). Each relay had the positive 24 volts on the other side of the coil.

When the blade touched either prong of the gauge (e.g., left and right gauge contact members 11 and 12), an electric circuit was completed to energize the appropriate relay. The relay sent a signal to the programmable logic controller (PLC) that the saw blade (e.g., saw blade 6) touched one side or the other.

The distance between the prongs of the gauge (e.g., left and right gauge contact members 11 and 12) was adjustable to train the saw blades (e.g., saw blades 6) to any desired tolerance. The machine used a prong spacing of between 0.055 in. and 0.065 in. The gauge sensor was mounted on a pneumatic cylinder (e.g., gauge positioner 13) to move the gauge (e.g., gauge 10) toward or away from the saw mandrel (e.g., saw mandrel 1).

During the sensing phase of the process, a small gear motor (e.g., saw mandrel motor 5) and a corresponding belt (e.g., saw mandrel belt 7) were used to turn the saw mandrel (e.g., saw mandrel 1) at about 10 revolutions per minute. A sixteen-tooth sprocket (e.g., sprocket 70) was attached and rotated on the saw mandrel (e.g., saw mandrel 1) as an indicator of where the saw blade (e.g., saw blade 6) was out of tolerance.

When a signal was received at the PLC (e.g., PLC 30) that the blade had touched, the signal was recorded in the PLC along with (i) the corresponding tooth (e.g., sprocket tooth 72) on the sprocket (e.g., sprocket 70) and (ii) which side of the saw blade touched. A proximity switch (e.g., sprocket sensor 71) was used to record the tooth count. (The more teeth on the sprocket (e.g., sprocket 70), the more points are checked, for example, in this case, 360/16=22.5 degrees, so the saw blade was checked at 16 points along the outer perimeter of the saw blade.

A bender (e.g., bender 20) having a forked steel tool (e.g., left and right bender contact members 21 and 22) was used to fit over the saw blade. The slot on the bender (e.g., the distance between left and right bender contact members 21 and 22) on the machine was approximately 0.045 in. The depth of the slot (e.g., the length of the gap between left and right bender contact members 21 and 22) was approximately 9 in. The bender (e.g., bender 20) was mounted on a plate (e.g., guide plate 451) and actuated by a pneumatic cylinder (e.g., bender positioner 24) to clear the saw mandrel (e.g., saw mandrel 1) on indexing.

The bender (e.g., bender 20) and gauge sensor (e.g., gauge 10) were attached to move together laterally on a movable support member (e.g., movable support member 40). The bender (e.g., bender 20) was mounted approximately 180° from the gauge sensor (e.g., gauge 10).

Knowing the gauge sensor (e.g., gauge 10) and (e.g., bender 20) were 180° apart, the programmable logic controller (PLC 30) was programmed to bend a given saw blade eight sprocket teeth (e.g., sprocket teeth 72) after a "touch" signal was received by the programmable logic controller (PLC 30).

The bender (e.g., bender 20) was actuated by two pneumatic cylinders (e.g., two pistons 47) mounted blind end to blind end or butt to butt. In the neutral position, one cylinder (e.g., one of two pistons 47) was extended and one retracted (e.g., one of two pistons 47). To bend the bender (e.g., bender 20) to the left, the retracted cylinder fired out. To bend the bender (e.g., bender 20) to the right, the extended cylinder was retracted.

A timer in the program of the programmable logic controller (PLC 30) controlled how far the cylinders extended. For example, if the bender (e.g., bender 20) had to bend the saw blade (e.g., saw blade 6) to the right for more than one revolution of the saw mandrel (e.g., saw mandrel 1), the bend right time was incrementally increased by the programmable logic controller (PLC 30).

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of automatically training saw blades along a saw mandrel comprising multiple saw blades, said method comprising:

positioning a gauge relative to a first saw blade along a saw mandrel such that left and right gauge contact members of the gauge extend along opposite left and right major surfaces of the first saw blade, respectively, and the first saw blade is between the left and right gauge contact members; and in response to the first saw blade touching at least one of the left and right gauge contact members during rotation of the saw mandrel, bending the first saw blade in a right direction if the first saw blade touches the left gauge contact member, and bending the first saw blade in a left direction if the first saw blade touches the right gauge contact member.

2. The method of claim 1, further comprising:

positioning a bender relative to the first saw blade such that left and right bender contact members of the bender extend along the opposite left and right major surfaces of the first saw blade, respectively, and the first saw blade is between the left and right bender contact members; and rotating the saw mandrel.

3. The method of claim 2, further comprising:

in response to the first saw blade not touching the left or right gauge contact members during at least one complete rotation of the saw mandrel, moving the gauge and the bender away from the first saw blade such that the left and right gauge contact members of the gauge and the left and right bender contact members of the bender do not extend along the opposite left and right major surfaces of the first saw blade;

subsequently moving the gauge and the bender along the saw mandrel a distance equal to a spacing between adjacent saw blades; and moving the gauge and the bender toward a second saw blade of the saw mandrel such that the left and right gauge contact members of the gauge and the left and right bender contact members of the bender extend along opposite left and right major surfaces of the second saw blade.

4. The method of claim 3, further comprising:

in response to the second saw blade touching at least one of the left and right gauge contact members during rotation of the saw mandrel, bending the second saw blade in a right direction if the second saw blade touches the left gauge contact member, and bending the second saw blade in a left direction if the second saw blade touches the right gauge contact member.

5. The method of claim 1, further comprising:

providing an electrical current through the saw mandrel and the left and right gauge contact members of the gauge such that (i) contact of the first saw blade with the left gauge contact member of the gauge completes a first circuit and send a first signal to a programmable logic controller, and (ii) contact of the first saw blade with the right gauge contact member of the gauge completes a second circuit and send a second signal to the programmable logic controller.

6. The method of claim 5, further comprising:

in response to the programmable logic controller receiving the first signal, sending a first command to the bender so as to cause the bender to bend the first saw blade in the right direction; and in response to the programmable logic controller receiving the second signal, sending a second command to the bender so as to cause the bender to bend the first saw blade in the left direction.

7. The method of claim 2, wherein the bender is positioned directly opposite the gauge relative to the saw mandrel such that any point along the first saw blade that touches the left or right gauge contact member of the gauge travels 180° during rotation of the saw mandrel so as to be positioned between the left and right bender contact members of the bender.

8. A method of automatically training saw blades along a saw mandrel, said method comprising:

rotating a saw mandrel comprising multiple saw blades spaced from one another along the saw mandrel; and in response to a first saw blade not touching left or right gauge contact members of a gauge during at least one complete rotation of the saw mandrel and while the gauge is in an activated position, moving the gauge into a deactivated position via a programmable logic controller; and subsequently moving the gauge and a bender along the saw mandrel a distance equal to a spacing between adjacent saw blades via the programmable logic controller.

9. The method of claim 8, further comprising:

in response to the first saw blade touching at least one of the left and right gauge contact members of the gauge during rotation of the saw mandrel and while the gauge is in an activated position, bending the first saw blade in a right direction if the first saw blade touches the left gauge contact member, and bending the first saw blade in a left direction if the first saw blade touches the right gauge contact member.

10. The method of claim 9, further comprising:

positioning the gauge relative to the first saw blade along the saw mandrel such that the left and right gauge contact members of the gauge extend along opposite left and right major surfaces of the first saw blade, respectively, and teeth of the first saw blade are between the left and right gauge contact members; and positioning a bender relative to the first saw blade such that left and right bender contact members of the bender extend along the opposite left and right major surfaces of the first saw blade, respectively, and teeth of the first saw blade are between the left and right bender contact members.

11. An apparatus for performing the method of claim 1, said apparatus comprising:

the gauge comprising the left and right gauge contact members;

a bender comprising left and right bender contact members; and an apparatus component operatively adapted to move the left and right bender contact members relative to the first saw blade.

12. An apparatus for performing the method of claim 8, said apparatus comprising:

a support structure operatively adapted to support and allow rotation of a saw mandrel;

a motor and associated connecting components operatively adapted to rotate the saw mandrel;

the gauge comprising the left and right gauge contact members; and the programmable logic controller.

13. An apparatus for automatically training saw blades along a saw mandrel, said apparatus comprising:

a gauge comprising left and right gauge contact members, said left and right gauge contact members being spaced from one another so as to be positionable along opposite left and right major surfaces of a first saw blade positioned along a saw mandrel such that teeth of the first saw blade are between the left and right gauge contact members; and a bender comprising left and right bender contact members, said left and right bender contact members being spaced from one another so as to be positionable along the opposite left and right major surfaces of the first saw blade such that teeth of the first saw blade are between the left and right bender contact members, wherein in response to the first saw blade touching at least one of said left and right gauge contact members during rotation of the saw mandrel, said bender being operatively adapted to (i) bend the first saw blade in a right direction if the first saw blade touches the left gauge contact member, and (ii) bend the first saw blade in a left direction if the first saw blade touches the right gauge contact member.

14. The apparatus of claim 13, wherein the bender is positioned directly opposite the gauge relative to the saw mandrel such that any point along the first saw blade that touches the left or right gauge contact member of the gauge travels 180° during rotation of the saw mandrel so as to be positioned between the left and right bender contact members of the bender.

15. The apparatus of claim 13, further comprising:
one or more apparatus components operatively adapted to move the gauge and the bender toward or away from the first saw blade.

16. The apparatus of claim 13, further comprising:
a support structure operatively adapted to support and allow rotation of a saw mandrel;
a first motor and associated connecting components operatively adapted to rotate the saw mandrel when positioned within the support structure;
a ball screw extending parallel to the saw mandrel when positioned within the support structure;
a second motor and associated connecting components operatively adapted to rotate the ball screw; and
a movable support structure operatively adapted to (i) support the gauge and the bender, and (ii) move along the ball screw.

17. The apparatus of claim 16, further comprising:
a first gear coaxially positioned along said ball screw;
a second gear in rotationable contact with said first gear; and
a gear sensor operatively adapted to detect a position of said second gear,
wherein one complete rotation of said second gear moves said movable support structure a distance along said ball screw equal to a spacing between adjacent saw blades.

18. The apparatus of claim 13, further comprising:
a sprocket coaxially positioned along the saw mandrel; and
a sprocket sensor operatively adapted to detect a rotating position along said sprocket relative to said sprocket sensor.

19. The apparatus of claim 13, further comprising:
an electrical current through the saw mandrel such that (i) contact of the first saw blade with the left gauge contact member of the gauge completes a first circuit and generates a first signal, and (ii) contact of the first saw blade with the right gauge contact member of the gauge completes a second circuit and generates a second signal; and
a programmable logic controller operatively adapted to receive said first and second signals, and in response to receiving the first signal, sending a first command to the bender so as to cause the bender to bend the first saw blade in the right direction, and in response to receiving the second signal, sending a second command to the bender so as to cause the bender to bend the first saw blade in the left direction.

20. The apparatus of claim 13, wherein the bender is positioned directly opposite the gauge relative to the saw mandrel such that any point along the first saw blade that touches the left or right gauge contact member of the gauge travels 180° during rotation of the saw mandrel so as to be positioned between the left and right bender contact members of the bender, and said apparatus further comprises:
one or more apparatus components operatively adapted to move the gauge and the bender toward or away from the first saw blade;
a support structure operatively adapted to support and allow rotation of a saw mandrel;
a first motor and associated connecting components operatively adapted to rotate the saw mandrel when positioned within the support structure;
a ball screw extending parallel to the saw mandrel when positioned within the support structure;
a second motor and associated connecting components operatively adapted to rotate the ball screw;
a movable support structure operatively adapted to (i) support the gauge and the bender, and (ii) move along the ball screw;
a first gear coaxially positioned along said ball screw;
a second gear in rotationable contact with said first gear;
a gear sensor operatively adapted to detect a position of said second gear, wherein one complete rotation of said second gear moves said movable support structure a distance along said ball screw equal to a spacing between adjacent saw blades;
a sprocket coaxially positioned along the saw mandrel;
a sprocket sensor operatively adapted to detect a rotating position along said sprocket relative to said sprocket sensor;
an electrical current through the saw mandrel such that (i) contact of the first saw blade with the left gauge contact member of the gauge completes a first circuit and generates a first signal, and (ii) contact of the first saw blade with the right gauge contact member of the gauge completes a second circuit and generates a second signal; and
a programmable logic controller operatively adapted to receive said first and second signals, and in response to receiving the first signal, sending a first command to the bender so as to cause the bender to bend the first saw blade in the right direction, and in response to receiving the second signal, sending a second command to the bender so as to cause the bender to bend the first saw blade in the left direction.

* * * * *